H. SIEGWART.
DEVICE FOR TIGHTENING AND REINFORCING TUBULAR BODIES, SUCH AS PIPES, MASTS, PILLARS, AND THE LIKE.
APPLICATION FILED MAR. 23, 1912.

1,084,906.

Patented Jan. 20, 1914.

2 SHEETS—SHEET 1.

Witnesses:

Inventor:
Hans Siegwart,

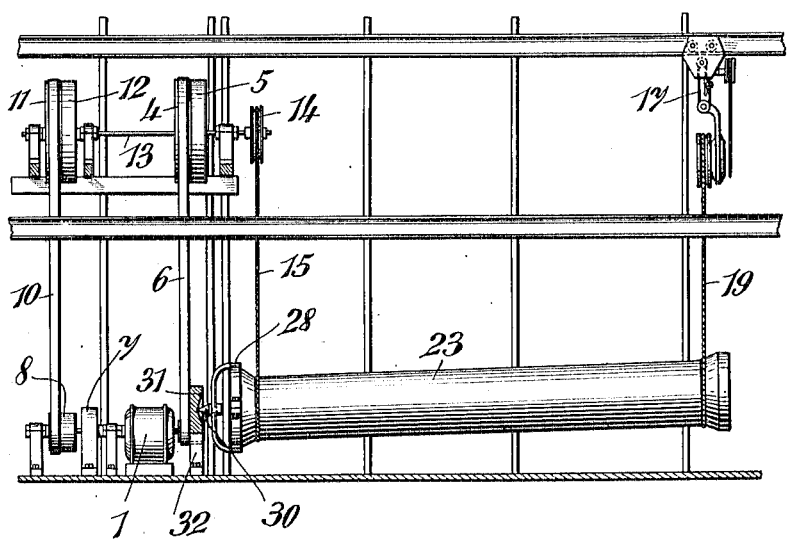

UNITED STATES PATENT OFFICE.

HANS SIEGWART, OF LUCERNE, SWITZERLAND.

DEVICE FOR TIGHTENING AND REINFORCING TUBULAR BODIES, SUCH AS PIPES, MASTS, PILLARS, AND THE LIKE.

1,084,906.  Specification of Letters Patent.  Patented Jan. 20, 1914.

Application filed March 23, 1912. Serial No. 685,819.

*To all whom it may concern:*

Be it known that I, HANS SIEGWART, a citizen of the Republic of Switzerland, residing at Lucerne, in Switzerland, have invented certain new and useful Improvements in Devices for Tightening and Reinforcing Tubular Bodies, such as Pipes, Masts, Pillars, and the like, of which the following is a specification.

This invention relates to devices for tightening and reinforcing tubular bodies such as pipes, masts, pillars and the like.

In the device according to this invention in order to be turned for the purpose of being tightened and reinforced by a strained wire the tubular body is suspended by endless slings which can be driven at a variable speed.

Figure 1:
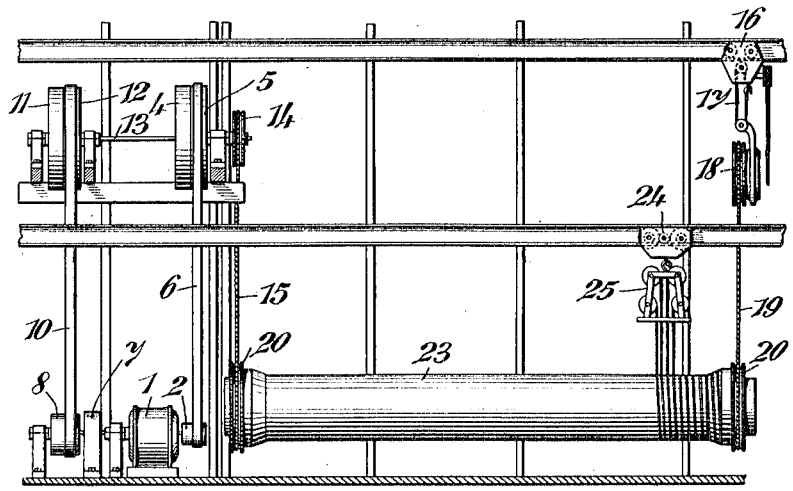
Figure 2:
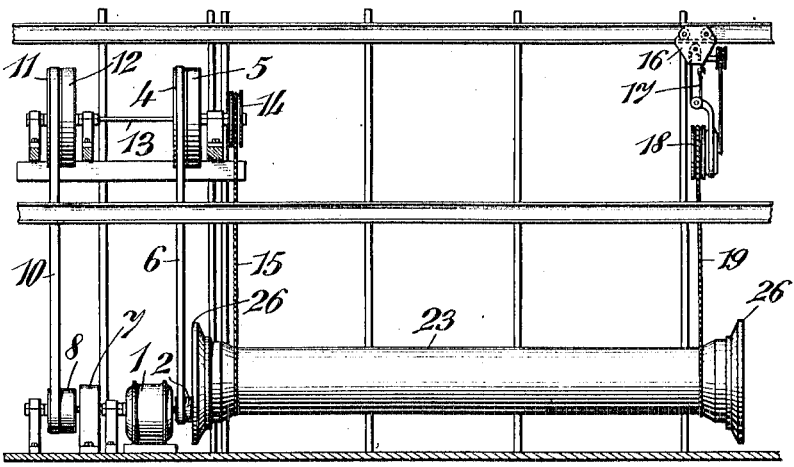
Figures 3, 4:
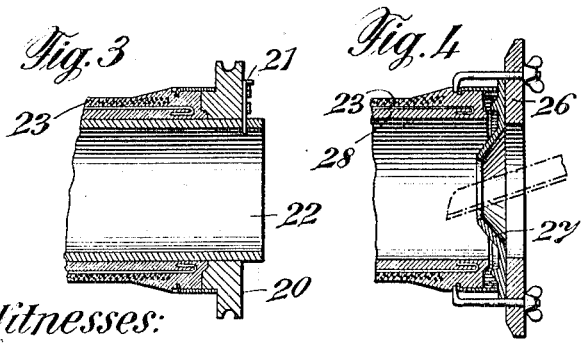
Figure 5:
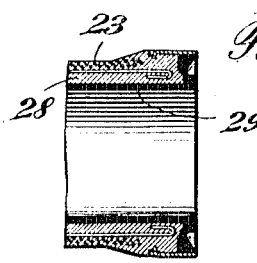

In the accompanying drawings, which illustrate by way of example one embodiment of my invention, Figure 1 shows the device as fitted for reinforcing, Fig. 2 shows the same device as fitted for tightening by asphalt. Fig. 3 is a longitudinal section showing the end portion of a tubular body to be reinforced. Fig. 4 is a similar view showing the end portion of a tubular body to be tightened. Fig. 5 is a similar view showing the end portion of a reinforced and tightened tubular body. Fig. 6 shows the device as fitted for tightening by cement.

1 designates an electro-motor, on the shaft of which is mounted at one end a pulley 2 from which a fixed pulley 4 and a loose pulley 5 can be impelled by means of a belt 6. The other end of the motor shaft is connected to a speed reducing gearing 7 by which a pulley 8 can be driven. From this latter pulley a loose pulley 11 and a fixed pulley 12 can be impelled. The pulleys 4, 5, 11 and 12 are mounted on a common shaft 13, which fixedly carries a rope pulley 14. To this latter pulley either a large speed may be imparted from the pulley 2 or a low speed from the pulley 8. An endless rope 15 is driven by the pulley 14. A tackle 18 is mounted on a traveling crab 17, which tackle carries a second rope pulley 18 for an endless rope 19. The ropes 15 and 19 engage pulleys 20 which are secured to the cores 22 of the pipes by means of bolts 21 (Fig. 3). If the belt 6 runs on the loose pulley and the belt 10 on the fixed pulley (Fig. 1) by rotating the shaft 13 the pipe 23 is slowly rotated. By this, reinforcing wire is wound on the tubular body from a device 25 mounted on a traveling crab 24, the tubular body being at the same time covered by hand by a coating of concrete.

The device as described is also used for tightening the interior of the tube when removed from the core 22. If asphalt is to be applied, the rope pulleys 20 are replaced by wooden rings 26 (Fig. 4) while inserting a funnel 27. The pipe 23 is immediately supported by the ropes 15 and 19. The belt 6 remains at first on the loose pulley, the belt 10 on the fixed pulley and the motor being stopped, asphalt is filled into the pipe 23 unto a certain level. It is expedient to raise during this time by means of the tackle 17 the end of the pipe through which the asphalt is filled so that the asphalt flows to the other end. After the axis of the pipe being horizontally adjusted again the motor is started and the pipe slowly turned some revolutions so that the asphalt covers the whole inner surface. Hereafter the belt 6 is moved on the fixed pulley and the belt 10 on the loose pulley (Fig. 2) whereby the pipe is rotated at a large speed so that the asphalt is caused to enter the minute passages of the shell 28 of artificial stone. The asphalt then forms an equal lining 29 at the interior and the front sides of the pipe (Fig. 5).

The same device may also be used if desired to tighten the interior of the pipe by means of mortar. For this purpose the tackle 17 is operated so that the pipe 23 is brought in an inclined position (Fig. 6). In order to prevent the pipe to escape by its inclined position from the ropes 15 and 19 a yoke 30 is secured to the lower end of the pipe 23, which yoke is provided with a point 30 mounted in a bearing 31 on a frame 32. The mortar is poured in at the upper end and the pipe rotated at a large speed while remaining in its inclined position. The mortar being prepared with an ample addition of water is divided by centrifugal action in three different layers. The heavy ingredients, such as the coarse grains of the cement and the sand adhere to the wall, while a subtile layer of cement remains inside, which layer is composed of the finest particles of the cement. This layer forms a glaze at the interior of the pipe and becomes very watertight after being hardened. The water being the lightest ingredient is pressed toward the interior. If the motor should be immediately stopped the subtile glaze of cement would be washed off by the water. For this reason the rotation of the inclined pipe is maintained and the layer of cement pressed toward the wall by centrifugal action while the water flows down. Hereby a very smooth inner layer is obtained. Such tightening by cement is sufficient for a pressure of 3 to 4 atmospheres, for larger pressures asphalt is applied.

The suspension of the tubular bodies by endless ropes, which could also be replaced by endless chains or the like has the advantage that the tubular body always remains centered and that by means of the tackle also conical tubular bodies can be adjusted to be tightened and equally reinforced. Pipes of any diameter can be introduced in the ropes which pipes automatically are centered.

I claim:

1. In a device for tightening and reinforcing tubular bodies such as pipes, masts, pillars and the like, suspended endless slings for carrying the tubular bodies and means for impelling one of said slings at a variable speed.

2. In a device for tightening and reinforcing tubular bodies such as pipes, masts, pillars and the like, suspended endless slings for carrying the tubular bodies, a lifting device supporting one of said slings and means for impelling one of said slings at a variable speed.

3. In a device for tightening and reinforcing tubular bodies such as pipes, masts, pillars and the like, suspended endless slings for carrying the tubular bodies, means for impelling one of said slings at a variable speed, and a funnel shaped rim adapted to be mounted at one end of the tubular body for filling in a tightening medium as asphalt and cement mortar.

4. In a device for tightening and reinforcing tubular bodies such as pipes, masts, pillars and the like, suspended endless slings for carrying the tubular bodies, a lifting device supporting one of said slings, means for impelling one of said slings at a variable speed, a yoke adapted to be secured to one end of the tubular body, a point provided on said yoke and a bearing supporting said point.

In testimony whereof I have affixed my signature in presence of two witnesses.

HANS SIEGWART.

Witnesses:
CHARLES C. BLAUKAR,
PAUL DELMDER.